(12) United States Patent
Lu et al.

(10) Patent No.: US 9,239,434 B2
(45) Date of Patent: Jan. 19, 2016

(54) LOOSE TUBE CONNECTOR TERMINATION

(71) Applicant: ADC Telecommunications, Inc., Berwyn, PA (US)

(72) Inventors: Yu Lu, Eden Prairie, MN (US); Ronald A. Beck, Naples, FL (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 14/563,326

(22) Filed: Dec. 8, 2014

(65) Prior Publication Data

US 2015/0093082 A1 Apr. 2, 2015

Related U.S. Application Data

(62) Division of application No. 13/492,394, filed on Jun. 8, 2012, now Pat. No. 8,931,964.

(60) Provisional application No. 61/494,747, filed on Jun. 8, 2011.

(51) Int. Cl.
*G02B 6/36* (2006.01)
*G02B 6/38* (2006.01)

(52) U.S. Cl.
CPC ............... *G02B 6/362* (2013.01); *G02B 6/381* (2013.01); *G02B 6/389* (2013.01); *G02B 6/3833* (2013.01); *G02B 6/3861* (2013.01); *G02B 6/3887* (2013.01)

(58) Field of Classification Search
USPC ....................................... 216/24, 52
See application file for complete search history.

(56) References Cited

U.S. PATENT DOCUMENTS

| | | | |
|---|---|---|---|
| 5,261,019 A | 11/1993 | Beard et al. | |
| 5,381,497 A | 1/1995 | Toland et al. | |
| 5,469,521 A * | 11/1995 | Coutts et al. | 385/77 |
| 5,915,056 A | 6/1999 | Bradley et al. | |
| 6,287,404 B1 | 9/2001 | Kolasinski | |
| 6,936,122 B2 | 8/2005 | Kolasinski | |
| 7,147,385 B2 | 12/2006 | Zimmel et al. | |
| 7,708,469 B2 | 5/2010 | Lui et al. | |
| 8,931,964 B2 | 1/2015 | Lu et al. | |
| 2003/0021548 A1 * | 1/2003 | Luther et al. | 385/86 |
| 2010/0209052 A1 | 8/2010 | Liu et al. | |
| 2011/0002586 A1 | 1/2011 | Nhep | |

* cited by examiner

*Primary Examiner* — Shamim Ahmed
(74) *Attorney, Agent, or Firm* — Merchant & Gould P.C.

(57) ABSTRACT

A fiber optic connector assembly comprises a ferrule assembly including a ferrule and a hub. The ferrule has a distal end and a proximal end. The proximal end of the ferrule is mounted to the hub. The ferrule defines a fiber passage that extends through the ferrule from the proximal end to the distal end. The fiber optic assembly further comprises an optical fiber having an end portion potted within the fiber passage of the ferrule. A loose tube receives the optical fiber. The loose tube has a distal end positioned inside the hub and defines a venting opening that starts at the distal end of the loose tube and extends proximally along a length of the loose tube.

3 Claims, 6 Drawing Sheets

LOOSE TUBE CONNECTOR TERMINATION

CROSS-REFERENCE TO RELATED APPLICATION

The present application claims priority to U.S. patent application Ser. No. 13/492,394, filed Jun. 8, 2012, now U.S. Pat. No. 8,931,964, issued Jan. 13, 2015, which claims the benefit of U.S. Provisional Patent Application Ser. No. 61/494,747, filed Jun. 8, 2011, which application is hereby incorporated by reference in its entirety.

TECHNICAL FIELD

The present invention relates to techniques for terminating fiber optic cables with fiber optic connectors. More specifically, the present invention relates to connectorization arrangements and methods that reduce the likelihood for air to enter the adhesive used to pot an optical fiber within a fiber optic connector.

BACKGROUND

Fiber optic cables may be terminated in two ways—with connectors that can mate two fibers to create a temporary joint and/or connect the fiber to a piece of network equipment or with splices which create a permanent joint between the two fibers. Two basic fiber optic cable designs include loose tube cables and tight buffered cables. Loose tube cables can be designed to endure outside environmental conditions. In a loose tube cable, one or more optical fibers are loosely positioned within a buffer tube contained within an outer jacket of the cable. The buffer tube can be filled with gel to prevent water from migrating along a length of the buffer tube.

Over the years, numerous connector types have been developed. Although the mechanical design varies significantly among different fiber optic connector types, most fiber optic connectors include a fiber ferrule made of ceramic, such as zirconia, or metal, such as stainless steel and a ferrule holder, commonly known as a hub, retaining the ferrule. Other ferrules (e.g., multi-fiber ferrules) can be made of other types of materials such as thermoset materials (e.g., epoxy) or thermoplastic materials (e.g., polyphenylene sulfide (pps)). In the case of single fiber ferrules, a high precision hole is formed (e.g., drilled) in the center of the ferrule, and a stripped bare fiber (the glass core and glass cladding with the coating removed) is inserted through and usually bonded by an adhesive such as epoxy.

Adhesive such as epoxy is used to secure/pot an optical fiber within the ferrule and ferrule hub of a fiber optic connector. Voids or air pockets within the epoxy filling the ferrule hub can leave part of the optical fiber unsupported or unevenly supported thereby increasing the likelihood of optical fiber breakage.

One way of terminating a loose tube fiber optic cable with a fiber optic connector is to inject epoxy into the ferrule and then push the fiber into the ferrule. Alternatively, epoxy is applied to the fiber before the fiber is pushed into the ferrule. If the end of the loose tube spaced from the connector is sealed, the expansion of air inside the tube when curing the epoxy at high temperatures will push air out the end of the loose tube adjacent the connector there introducing bubbles (i.e., voids or air pockets) within the epoxy filling the ferrule hub. Alternatively, if the far end of the loose tube is open, capillary action will draw epoxy into the loose tube from the ferrule hub and leave an insufficient amount of epoxy in the ferrule hub and/or the ferrule.

Attempts have been made to reduce the likelihood of introducing air pockets in the epoxy potting a fiber of a fiber optic connector during assembly of the fiber optic connector. Example attempts are disclosed in U.S. Pat. Nos. 5,381,497; 6,936,122 and 7,708,469, the disclosures of which are hereby incorporated by reference in their entireties. Despite these attempts, improvements are still needed.

SUMMARY

In general terms, this disclosure is directed to methods and arrangements for reducing air pockets and/or voids in an adhesive filled space of a fiber optic connector.

One aspect relates to a fiber optic connector assembly comprising a ferrule assembly including a ferrule and a hub. The ferrule has a distal end and a proximal end and the proximal end of the ferrule is mounted to the hub. The ferrule defines a fiber passage that extends through the ferrule from the proximal end to the distal end. The fiber optic connector assembly also comprises an optical fiber having an end portion potted within the fiber passage of the ferrule. The fiber optic connector assembly further comprises a loose tube that receives the optical fiber and has a distal end positioned inside the hub. The loose tube defines a venting opening that starts at the distal end of the loose tube and extends proximally along a length of the loose tube.

Another aspect is an arrangement for reducing a risk of air entering an adhesive filled space in a fiber optic connector, the arrangement comprising: a loose tube configured to be provided over a coated optical fiber such that a portion of the coated optical fiber is protruding from an end of the loose tube; and a sealant configured to be applied over the protruding coated optical fiber and the end of the loose tube.

A further aspect relates to a method of reducing a likelihood of air entering an adhesive filled space in a fiber optic connector, comprising the steps of: providing a loose tube over a coated optical fiber such that a portion of the coated optical fiber is protruding from an end of the loose tube; applying a sealant over the protruding coated optical fiber and the end of the loose tube; and stripping the sealant and a coating of the coated optical fiber from a pre-determined section of the protruding portion of the coated optical fiber.

DETAILED DESCRIPTION

Figure 1:
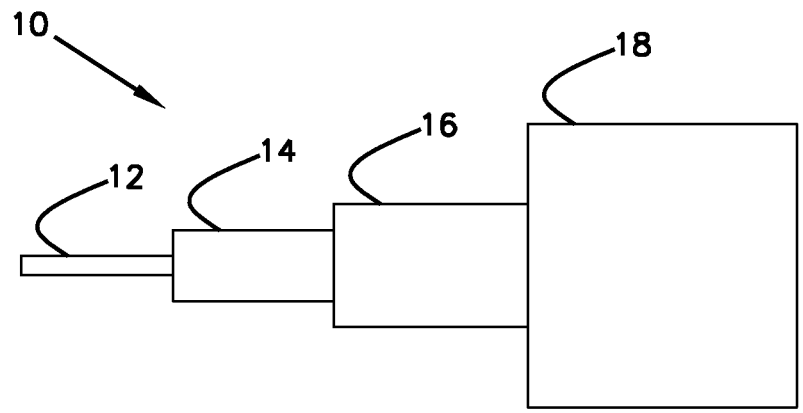
FIG. 1 shows an exemplary loose tube fiber optic cable construction.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 is an exemplary loose tube fiber optic cable 10 comprising a core 12 having an outer diameter of, for example, ten microns. The core 12 is the thin glass center of the fiber where the light travels. The core 12 is surrounded by a cladding 14 which is an outer optical material (e.g., glass) that reflects the light back into the core. The cladding typically has an outer diameter of about 125 microns. The core 12 and the cladding 14 constitute the inner optical fiber. A coating 16 that surrounds the cladding 14 protects the fiber from damage and moisture. The coating 16 typically has an outer diameter of, for example, about 250 microns. A loose tube covering 18 having an outer diameter of, for example, about 900 microns is applied over the coating 16 and further protects the fiber. This can also be referred to as upjacketing.

There are three main parts to a fiber optic connector: a connector body (i.e. a housing), a ferrule assembly mounted within the connector body and the strain relief boot. The connector body includes a distal end and a proximal end. The distal end can form a plug adapted for insertion in a corresponding fiber optic adapter. The ferrule assembly mounts within the connector body adjacent the distal end. The ferrule assembly includes a ferrule, a ferrule hub supporting a proximal end of the ferrule, and a ferrule spring that biases the ferrule and the hub in a distal direction relative to the connector body. The strain relief boot mounts at the proximal end of the connector body and prevents the optical fiber from bending past a critical point at which signal degradation occurs (i.e., a minimum bend radius).

Figure 2:
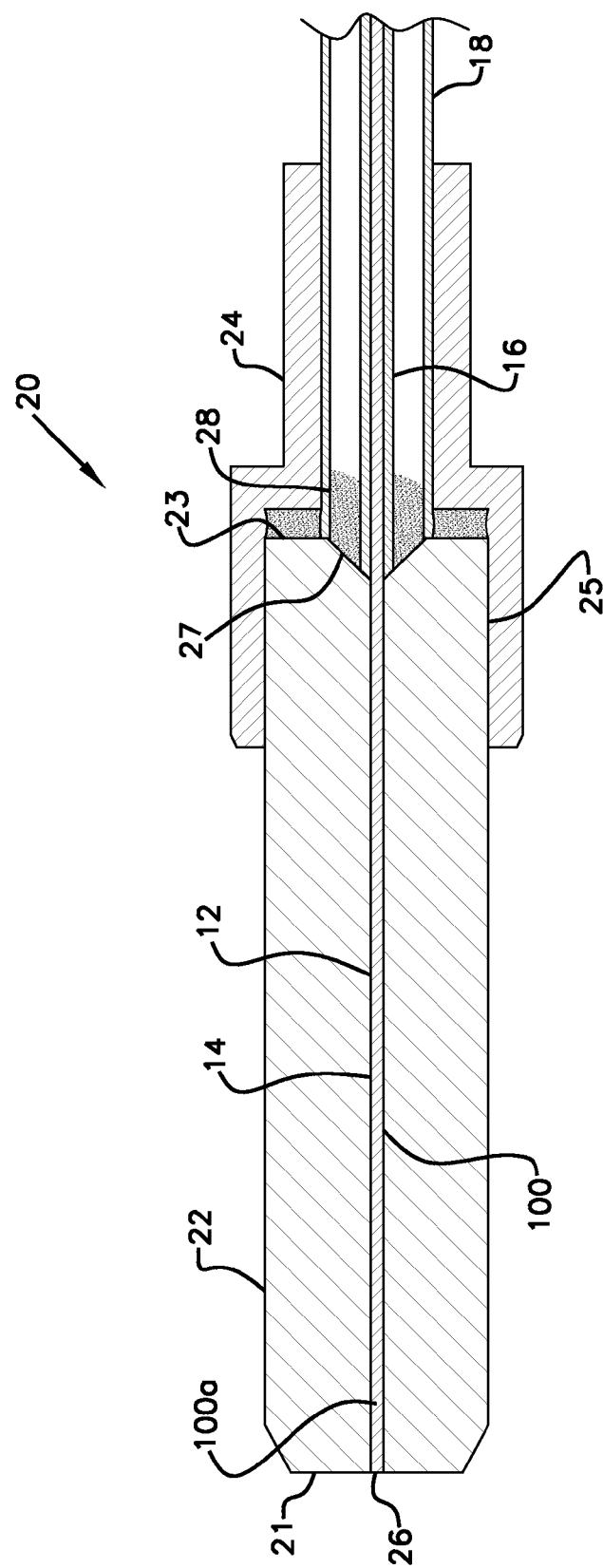
FIG. 2 is a cross-sectional side view of one embodiment of a fiber optic ferrule and a hub.

Example connectors are disclosed at U.S. Patent Application Publication No. 2011/002586; and U.S. Pat. Nos. 7,147,385; 5,261,019; and 5,915,056, which are hereby incorporated by reference in their entireties. FIG. 2 shows an exemplary ferrule assembly 20 comprising a fiber optic ferrule 22 mounted to a hub 24. Generally, ferrule 22 and hub 24 are secured together by convenient methods including press fit or adhesive mounts. Ferrule 22 and hub 24 are mounted within a connector body. A connector body can be one of a variety of well known connector types, including SC, FC, ST, LX.5, LC, and others. As will be described below, ferrule 22 and hub 24 are mounted at a distal end of a loose tube 18 of a fiber optic cable. An optical fiber 100 extends through the loose tube 18.

The ferrule 22 includes a central passage 26 which is concentric with a central axis of the ferrule 22. The central passage 26 extends from first distal end 21 of the ferrule 22 defining a ferrule tip to a second proximal end 23 and includes a portion 27 which is tapered inward from the second end 23 so as to facilitate insertion of the fiber during installation. The second end 23 of the ferrule 22 is received in a pocket 25 of the hub 24. The central passage 26 has a diameter sized for receiving a distal end portion 100a of the optical fiber 100. The distal end portion 100a is stripped so as to include only the core 12 and the cladding 14. A remainder of the fiber can include the protective coating 16.

Epoxy 28 or other adhesive is used within the central passage 26 to adhesively hold the end portion 100a of the fiber 100 within the ferrule 22. As discussed above, assembling of the optical fiber 100 within the hub 22 and the ferrule 24 may form voids or air pockets within the hub 24 or the ferrule 22 leaving parts of the fiber 100 unsupported inside the hub 24 and/or the ferrule 22. According to some embodiments of the invention, the loose tube 18 is provided with one or more air venting paths which reduces the capillary effect for both sealed and open ended conditions, i.e. when the opposite end of the tube is either sealed or open.

Figure 3:
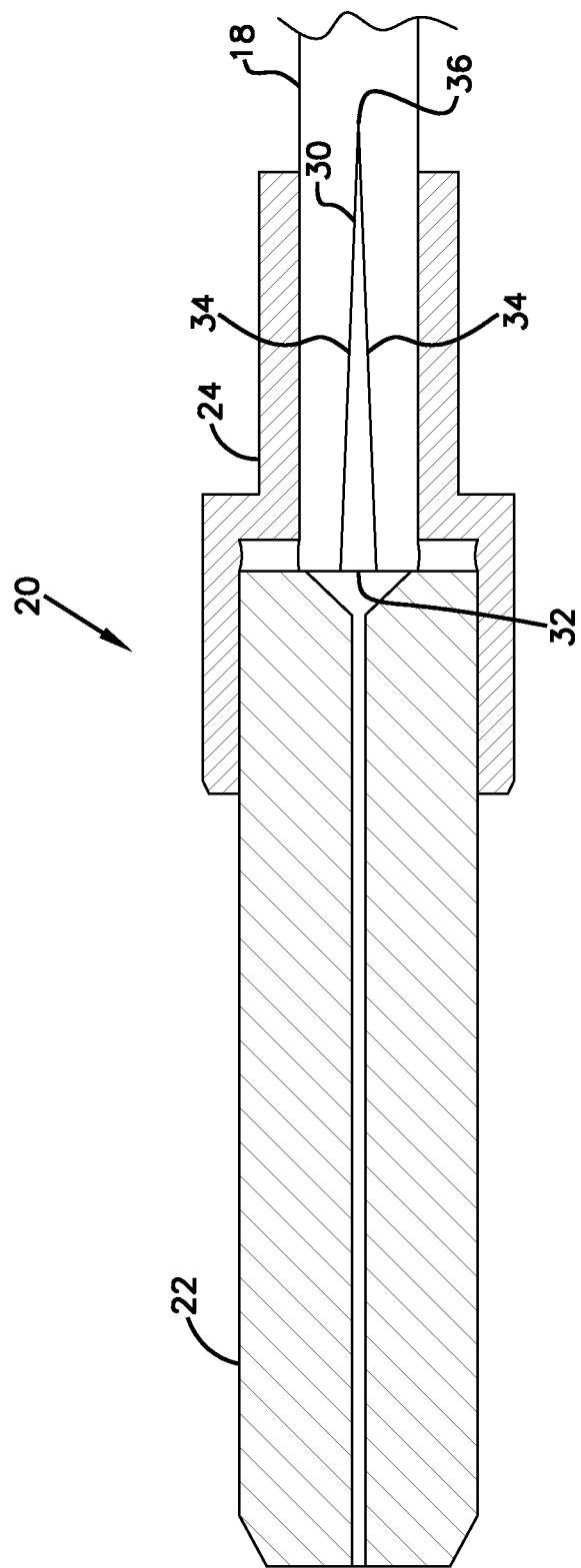
FIG. 3 is a cross-sectional side view of a fiber optic ferrule and a hub according to one embodiment of the present invention.

FIG. 3 shows the ferrule assembly 20 including the ferrule 22 and the hub 24. According to one embodiment of the invention, one or more slits 30 are provided in the loose tube 18. Only one slit 30 is shown in FIG. 3 forming an air venting path through which air can escape instead of being forced into the ferrule 22 and the hub 24. However, the tube 18 can also be provided with two or more slits. The slit 30 is starting at the distal end of the tube 18 and is extending along a length of the tube 18 and ends outside the hub 24. The slit 30 may be formed using a knife or other cutting tools. The slit 30 has an open end 32 positioned at the distal end of the tube 18 (i.e., adjacent the proximal end 23 of the ferrule 22) and a closed end 36 positioned outside the hub 24. The open end 32 is wider than the closed end 36. The edges 34 of the slit converge as the slit 30 extends away from the ferrule 22 such that the slit 30 has a triangular shape when viewed in plan view (see FIG. 3). The slit 30 is longer than a distance defined between the pocket 25 of the hub 24 and a proximal end of the hub 24.

Figure 4:
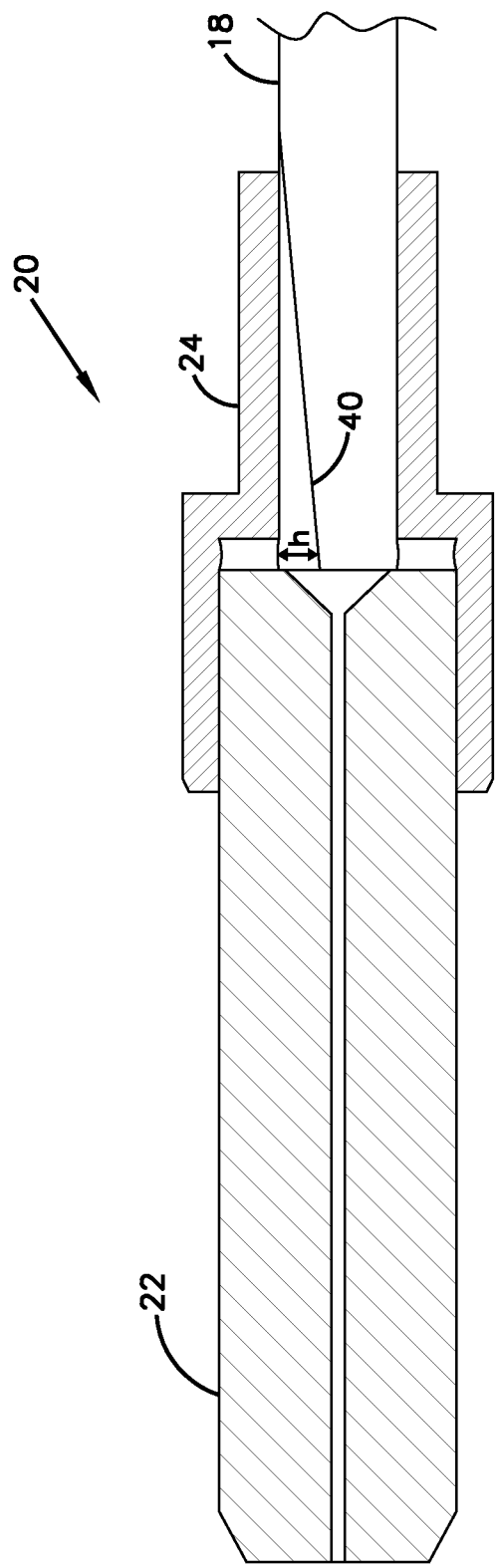
FIG. 4 is a cross-sectional side view of a fiber optic ferrule and a hub according to another embodiment of the present invention.

FIG. 4 shows a side view of the ferrule assembly 20 including the ferrule 22 and the hub 24. As depicted at FIG. 4, a piece of the tube of the loose tube 18 is cut away along a plane angled relative to a central axis of the loose tube 18 leaving a cut-out 40 of the tube 18 with parallel edges defining a plane having a triangular configuration which forms an air venting path through which air can vent instead of being forced into the potting material within the hub 24 or the ferrule 22. The proximal end of the cut-out 40 has a width generally equal to a diameter of the loose tube 18 and a height h equal to a radius of the tube. The triangular-shaped cut-out 40 extends outside the hub 24 so as to allow the air to flow from the inside of the ferrule 22 and hub 24 to the surroundings. The cut-out piece of the loose tube may be cut-out using a knife or other cutting tools.

Figure 5:
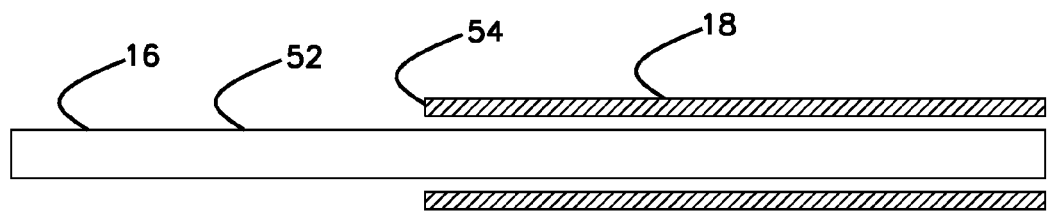
FIG. 5 is a schematic cross-sectional side view of a coated fiber and a loose tube.

According to some embodiments of the invention, the space between the loose tube 18 and the coating is sealed before assembling the fiber into the ferrule assembly 20. FIG. 5 shows the coated fiber 16 comprising the core 12 the cladding 14 and the coating 16 as shown in FIG. 1 and the loose tube 18 applied over the coated fiber 16. The loose tube 18 is applied over the coated fiber 16 to a desired length such that a portion 52 of the coated fiber 16 is protruding from the end 54 of the loose tube 18.

Figure 6:
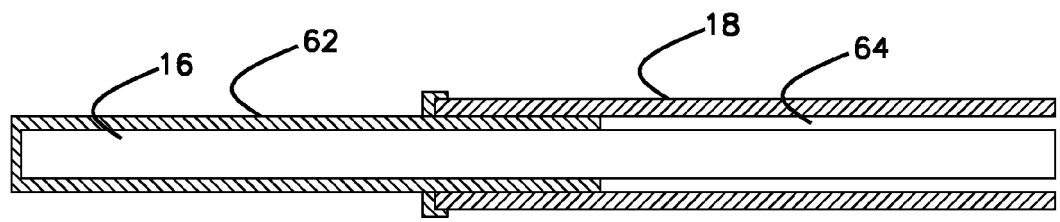
FIG. 6 is a schematic cross-sectional side view of a coated fiber and a loose tube to which a sealant has been applied.

FIG. 6 shows the coated fiber 16 and the loose tube 18, wherein a thin layer of sealant 62 has been applied to the end of the loose tube 18 and the coated fiber 16 protruding from the end of the loose tube 18. The sealant has low viscosity and may be of UV cure type or rapid heat cure type. When the sealant is applied to the end of the loose tube 18 and the coated fiber 16 protruding from the end of the loose tube 18, the sealant wicks into space 64 between the loose tube 18 and the coated fiber 16 by capillary action.

Figure 7:
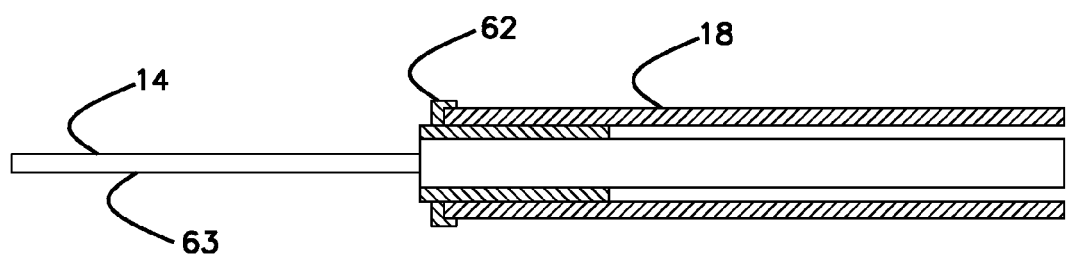
FIG. 7 is a schematic cross-sectional side view of a coated fiber and a loose tube according to still another embodiment of the present invention.

FIG. 7 shows the coated fiber 16 and the loose tube 18 provided with sealant 62 as in FIG. 6, wherein sealant 62 and coating 16 has been mechanically stripped from a distal end portion 63 of the optical fiber such that the distal end portion 63 of the fiber comprises only the core 12 and cladding 14. Sealant 62 and coating 16 have been stripped a suitable length for allowing the distal portion to be fully inserted within a ferrule (e.g., ferrule 22) of a ferrule assembly. Sealant 62 forms a plug that prevents air that is between the loose tube 18 and the coated fiber 16 from escaping into the epoxy potting area. Thus, adjacent the distal end of the loose tube, fluid communication is blocked between the inside of the loose tube 18 and the outside of the loose tube.

Figure 8:
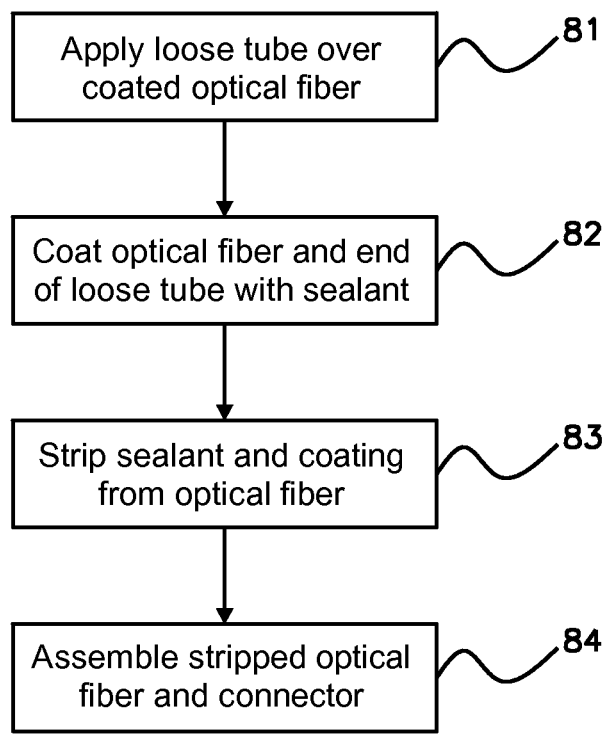
FIG. 8 is a flowchart illustrated the procedure performed according to some embodiments of the present invention.

According to some embodiments, a procedure of reducing incursion of air into an epoxy filled space of a fiber optic connector, as shown in FIG. 8, is as follows:

- applying loose tube over coated fiber to desired length (step 81), such that a portion of the coated fiber protrudes from the end of the loose tube;
- coating protruding coated fiber and end of loose tube with a thin layer of sealant (step 82), whereby sealant wicks into a space between loose tube and coated fiber by capillary action;
- stripping the thin sealant and the coating off the optical inner fiber to a pre-determined length (step 83) to prepare the optical fiber for insertion into the epoxy filled space of the fiber optic connector, whereby the sealant forms a plug to prevent air existing in the space between loose tube and coated fiber from incursing into the epoxy filled space of the fiber optic connector; and
- assembling the optical fiber and the fiber optic connector (step 84) by inserting the stripped optical inner fiber into the epoxy filled space of the ferrule of the connector.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

The invention claimed is:

1. A method of reducing a risk of air entering an adhesive filled space in a fiber optic connector, comprising the steps of:
    positioning a loose tube over a coated optical fiber such that a portion of the coated optical fiber is protruding from an end of the loose tube;
    applying a layer of sealant over the protruding coated optical fiber and the end of the loose tube after positioning the loose tube over the coated optical fiber, the layer of sealant wicking into space between the loose tube and the coated optical fiber; and
    stripping the layer of sealant and a coating of the coated optical fiber from a pre-determined section of the protruding portion of the coated optical fiber, the layer of sealant forming a plug adjacent the end of the loose tube such that fluid communication is blocked between an inside of the loose tube and an outside of the loose tube.

2. The method according to claim 1, wherein the plug further prevents air existing in the space between the loose tube and the coated optical fiber from incursing into the adhesive filled space of the fiber optic connector.

3. The method according to claim 1, further comprising assembling the coated optical fiber and the fiber optic connector by inserting the stripped protruding portion of the coated optical fiber into the adhesive filled space of a ferrule of the fiber optic connector.

* * * * *